US011741182B1

(12) United States Patent
Ferguson (10) Patent No.: US 11,741,182 B1
(45) Date of Patent: Aug. 29, 2023

(54) SYSTEMS AND METHODS FOR DYNAMIC CONTENT DISTRIBUTION (71) Applicant: CarMax Business Services, LLC, Richmond, VA (US)

(72) Inventor: Chris Ferguson, Midlothian, VA (US)

(73) Assignee: CARMAX ENTERPRISE SERVICES, LLC, Richmond, VA (US)

(*) Notice: Subject to any disclaimer, the term of this patent is extended or adjusted under 35 U.S.C. 154(b) by 84 days.

(21) Appl. No.: 17/343,529

(22) Filed: Jun. 9, 2021

Related U.S. Application Data (63) Continuation of application No. 16/892,720, filed on Jun. 4, 2020, now abandoned.

(51) Int. Cl.
G06F 16/00 (2019.01)
G06F 16/958 (2019.01)
G06Q 30/0601 (2023.01)
G06F 16/957 (2019.01)

(52) U.S. Cl.
CPC ........ *G06F 16/958* (2019.01); *G06F 16/9574* (2019.01); *G06Q 30/0625* (2013.01)

(58) Field of Classification Search
CPC .......................... G06F 16/958; G06F 16/9574
See application file for complete search history.

(56) References Cited

U.S. PATENT DOCUMENTS

10,438,264 B1    10/2019   Viswanathan
2008/0154878 A1   6/2008   Rose et al.

*Primary Examiner* — Paul Kim
(74) *Attorney, Agent, or Firm* — Troutman Pepper Hamilton Sanders LLP; Christopher J. Forstner; Scott A. Bergeson (57) ABSTRACT A system includes one or more processors configured to execute the instructions to dynamically link a plurality of content objects to a plurality of product pages, each content object and each product page having a first product tag. The system may assign each product page with a respective page score and each content object with a respective content score. The system may select a first product page having a first page score and a first content object having a first content score, compare the first content weight associated with the first content object to a first content threshold associated with the first product page and determine whether the first content object may be assigned to the first product page. When the first content weight is less than the first content threshold, the system may dynamically link the first content object with the first product page.

20 Claims, 5 Drawing Sheets

SYSTEMS AND METHODS FOR DYNAMIC CONTENT DISTRIBUTION

CROSS-REFERENCE TO RELATED APPLICATIONS

This application is a continuation of, and claims priority under 35 U.S.C. § 120 to, U.S. patent application Ser. No. 16/892,720, filed Jun. 4, 2020, the entire contents of which are fully incorporated herein by reference.

FIELD OF THE INVENTION

The present disclosure relates to system and methods for dynamically linking content objects to product pages, particularly systems and methods for distributing content objects having a first product tag to each of a plurality of product pages having the first product tag in descending order of a respective content score and product page score.

BACKGROUND

Businesses are increasingly more reliant on online sales to meet the changing needs of the modern economy. In today's discerning marketplace, new customers look towards content describing products offered for sale by businesses generated by existing customers as well as other sources. Accordingly, businesses must link relevant content to their product pages in order to drive online consumer demand. Existing methods of linking content to product pages require manually assigning product pages with content and periodically updating those pages with new content as new content becomes generated, which has several limitations that are only exacerbated by large product lines and product offerings. For example, manually keeping product pages up to date with the highest value content becomes inefficient and time consuming, is error-prone, and involves a time-lag that could detract from sales.

Accordingly, there is a need for improved systems and methods for dynamic content distribution.

SUMMARY

Disclosed embodiments provide systems and methods for dynamically linking content objects having a product tag to product pages having the product tag.

The system may have a data store including a plurality of product pages and a plurality of content objects. Each product page may have one or more associated product tags, and each content object may have one or more associated product tags. The system may assign each product page with a respective page score and each content object a respective content score. After assigning each product page and each content objects their respective scores, the system may select a first product page and a first content object based on a priority determined by the product page score and content score of each product page and content object. The content object may also have an associated content weight. The system may determine whether the first content object is assignable to the first product page by comparing the content weight associated with the content object to a content threshold associated with the first product page. When the content weight is less than the content threshold, the system may dynamically link the first content object with the first product page. The system may continue iteratively distributing a second content object to a second product page using the same process. The process may continue iteratively for a content objects and product pages having a second product tag, then a third product tag, etc., until all content objects have been assigned or all product pages have met their respective content thresholds.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology, and together with the description, serve to explain the principles of the disclosed technology. In the drawings.

DETAILED DESCRIPTION

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Figure 1:
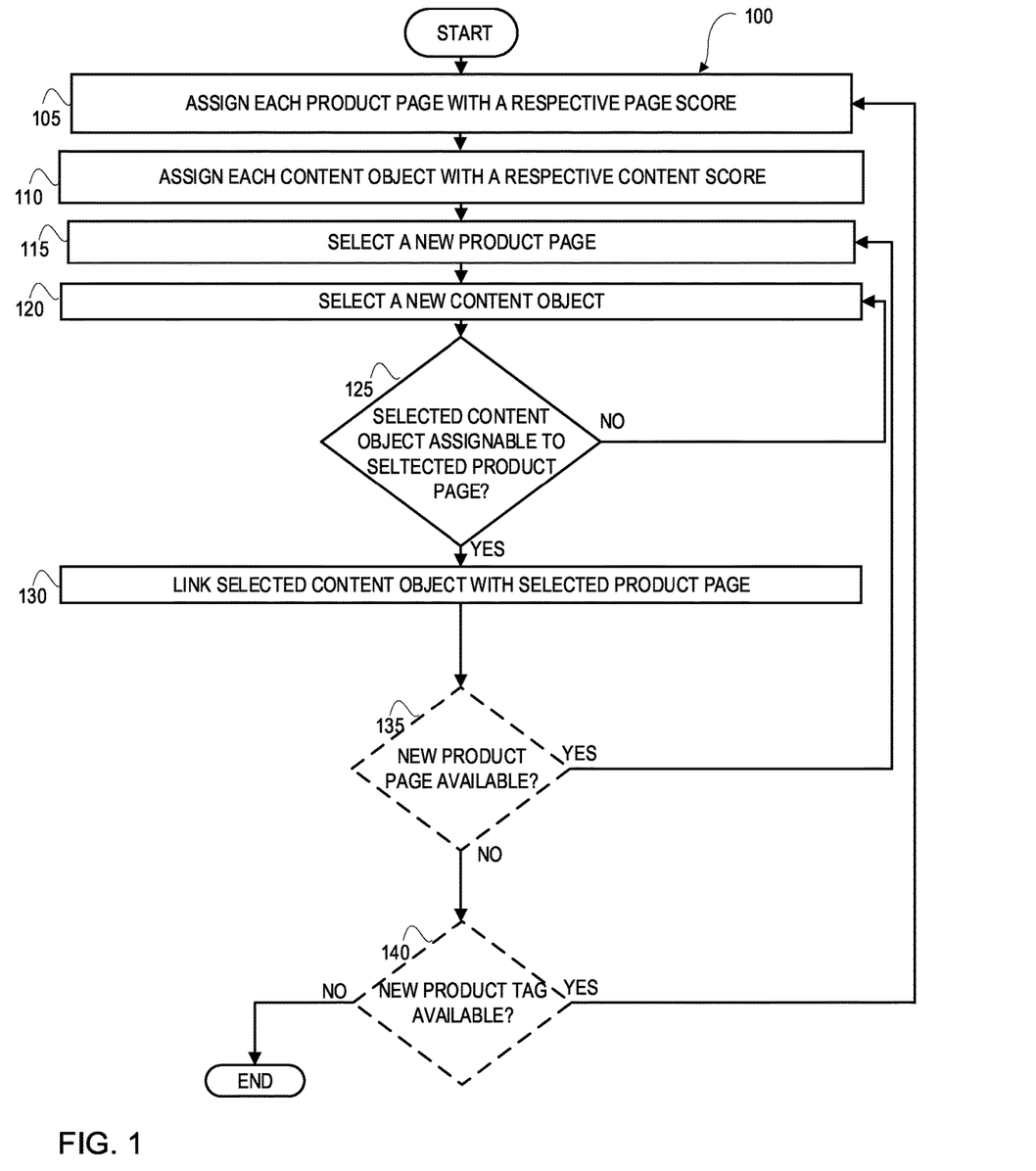
FIG. 1 is a flowchart of an exemplary method for dynamically linking a content object with a product page.

Method 100 includes a description of how a plurality of content objects are assigned to a plurality of product pages, wherein each of the plurality of content objects and each of the plurality of product pages are associated with the same respective product tag (e.g., the first product tag). After the system (e.g., dynamic content distribution system 420) iteratively distributes all content objects with a respective product tag to all of the pages with the same respective product tag, the system may continue the process for a different product tag. For example, the data store (e.g., database 422) may include a second plurality of content objects associated with a second product tag, and a second plurality of product pages also associated with the second product tag. Accordingly, the system may follow steps similar to those described in method 100 to iteratively distribute the second plurality of content objects with the second product tag to the plurality of product pages also having the second product tag. Additionally, the system may determine a priority queue among the product tags assigned to the plurality of product pages and the plurality of content objects such that content objects having higher priority product tags (e.g., the first product tag) may be iteratively assigned by the system to the plurality of product pages having the higher priority product tag before beginning the process for a lower priority product tag (e.g., the second product tag).

FIG. 1 is a flowcharts of an exemplary method for dynamically linking a content object with a product page. FIG. 1 shows steps of a method 100 that may be formed by one or more systems disclosed herein (e.g., a system 400 and/or a dynamic content distribution system 420 as described in more detail with respect to FIGS. 4-5). As shown in step 105 of method 100, the system (e.g., dynamic content distribution system 420) may assign each product page with a respective page score. The page score may be indicative of a page value, such that a higher value product page will be assigned a respective content object before a lower value page is assigned a content object. As described in more detail with respect to FIG. 3, the page score may be calculated based in part on a custom selection indicia. In some embodiments, the custom selection indicia may comprise search engine optimization (SEO) data. For example, the system may adjust the page score based in part on a click-through rate, or any other SEO indicia that may be used to compare product pages to see which pages generate the most sales, interest, clicks, etc. In another embodiment, the page score may be determined based on a product tag associated with the product page. A product tag may be used to indicate that a product page having the respective product tag has been marked by the system (e.g., by dynamic content distribution system 420) to receive distributions of content objects having the same product tag. Each product page may have a content threshold specific for each product tag that the product page has associated with it. For example, Page A may be associated with a product tag "Honda" and a product tag "Accord." Accordingly, the page may receive content objects associated with "Honda Accords" and "Honda" in general, but would not be able to receive content objects that are associated with, e.g., "Honda Pilot." Accordingly, only relevant content may be algorithmically assigned to the product pages according to the assigned one or more product tags. Additionally, in some embodiments product pages including both a vehicle "make" product tag and a "model" product tag may have the highest product page score of the plurality of product pages within the system. These pages may be followed by product pages having a vehicle "make" product tag and a "type" product tag (e.g., a product page for "Ford trucks"). Lower in the hierarchy may be pages having just a "make" product tag, followed by pages tagged for "make," "model," and "trim." More specific pages generally may be associated with a lower page score because more specific terms are of interest to a respective smaller subset of potential customers. Continuing the example, the system (e.g., content distribution system 420) may include a data store (e.g., database 422, described in more detail with respect to FIG. 4) storing a plurality of product pages and a plurality of content objects. For example, among the plurality of product pages, the system (e.g., dynamic content distribution system 420) may assign Page A a content threshold for each product tag. Additionally, the system may generate a priority queue among the product tags assigned to all of the plurality of pages, such that the system first distributes content having the higher priority product tag to all of the plurality of product pages before beginning the distribution process for the lower priority product tag.

In step 110, the system may assign each content object (e.g., the plurality of content objects that may be stored within database 422) with a respective content score. The content score may indicate a priority among the plurality of content objects. For example, the system may distribute a higher priority content score content object before distributing a content object having a lower priority score. In addition to a content score, each of the plurality of content objects may have associated one or more product tags (e.g., product tag X, as discussed earlier), a content weight, a content type, and the content itself. The system may assign each of the plurality of content objects a content weight that the system may use in order to determine whether a respective content object may be assigned to a respective product page by comparing the content weight to the content threshold associated with the respective product page. The content weight and the content score may be interrelated, but not identical. For example, a content object A having a content score higher than that of content object B will also have a higher content weight than that of content object B, although there may not exist a 1:1 proportional relationship between an assigned content score and the content weight. In some embodiments the content weight may be determined based on applying a scaling factor to the content score. In other embodiments, the content weight may be determined based on a machine learning algorithm that adjusts the scaling factor for various content based on improvement of one or more custom selection indicia for product pages that have been assigned a respective content object. For example, the content score as may be one input into the algorithm as well as custom selection indicia for a respective product page before a respective content object was assigned and after the respective content object was assigned to the page. In some embodiments, the system may continuously monitor for and categorize each of the plurality of content objects (e.g., via one of a plurality of content adaptors 424, described in more detail with respect to FIGS. 4-5) by assigning each of the plurality of content objects a respective content type. For example, the content type of a respective content object may be a customer review, reliability data, and/or a related article content object.

In step 115, the system (e.g., content distribution system 420) may select a new product page associated with a first product tag. As noted earlier, in some embodiments, the first product tag may be indicative of a higher priority queue among the plurality of product tags assigned to a respective product page. The selected product page may have a first page score, which may be indicative of a highest priority product page. Similarly, in step 120, the system may select a new (e.g., second, third, . . . , $n^{th}$) content object having the first product tag and a first content score.

In decision block 125, the system may determine whether the first content object is assignable to the first product page. The system may determine whether the first content object is assignable to the first product page by comparing a first content weight associated with the first content object to a first content threshold associated with the first product page. When the first content weight is less than the first content threshold, the system may dynamically link the first content object with the first product page in step 130. For example, the first product page may have a first content threshold of 100. The first product page may have already been assigned three content objects, content object A, B, and C. Collectively, content objects A-C have brought the respective product page to a value of 70/100. The system may now wish to distribute content object D to the product page. Because the threshold value of 100 has not been met, object D is assignable to the first product page. To determine assignability, it does not matter whether object D raises the value of the respective product page up to the content threshold of 100, or causes the page to surpass this value— either way object D may be assigned to the first product page. In other words, the system (e.g., dynamic content distribution system 420) may first check whether there is space to assign another object (i.e., is the current product page value of 70 less than the content threshold of 100?) and if the system determines, e.g., that the current product page value is less than the content threshold, then the respective content object (e.g., content object D) is assigned regardless of whether it would cause the page value to be above the content threshold. After content object D is assigned, the system may check whether the respective content threshold of 100 has been met, and determine that the first product page has met the threshold. By performing a content threshold check only after a respective content object is assigned, the system may be streamlined and save processing power over a system in which, e.g., content D would not be assigned if it caused the first product page to reach a value greater than the content threshold, because checking for the content threshold after assignment reduces the strain on holding unassignable content objects in memory during the algorithmic content distribution process. When the first content object is not assignable to the first product page, the method 100 may return to step 120 to select another new (e.g., second, third, . . . , $n^{th}$) content object having the first product tag and a new (e.g., second) content score. In some embodiments, the system (e.g., dynamic content distribution system 420) may select a second content object in response to determining that the first content object is not assignable to the first product page. The first content object may be unassignable to the first product page because the first content weight is not less than the first content threshold. The second content object may have the same first product tag as the first product page. Additionally, the second content object may have a second content score and a second content weight. The second content score may indicate a lower priority than the first content score associated with the first content object. Accordingly, the system (e.g., dynamic content distribution system 420) may select the higher priority first content object for distribution to a product page before selecting the lower priority second content object for distribution to a product page.

The second content weight may indicate whether a content object having the second content weight may be assignable to a respective product page by comparing the second (e.g., or third, fourth, . . . , $n^{th}$) content weight to the content threshold associated with the respective product page. In a second, third, . . . , $n^{th}$, etc. iteration of steps 125 and steps 130, the system may continue iteratively assigning content objects to the selected (e.g., second, third, . . . , $n^{th}$, etc.) product page until the select product page content threshold is met.

In decision block 135, the system may determine whether a new product page having the selected (e.g., first, second, third, . . . , $n^{th}$) product tag is available. In some embodiments, the new (e.g., second, third, . . . , $n^{th}$) product page may have a new (e.g., second, third, . . . , $n^{th}$) page score. For example, a second page score may have a lower priority than a first page score such that a product page having the first page score may be selected for dynamic content distribution before a product page having the second page score may be selected for dynamic content distribution. When a new product page is available, method 100 may return to step 115, in which the system (e.g., dynamic content distribution system 420) may select a new (e.g., second, third, . . . , $n^{th}$) product page and continue iterative linking content objects to the selected product page as described in steps 115-130. The data store (e.g., database 422) may include a plurality of content objects. Accordingly, in some embodiments, the system may continue to select content objects in descending order of priority (determined by a respective content score of the plurality of content objects) until all the content objects have been assigned or all the product pages have met their respective thresholds. For example, the system (e.g., dynamic content distribution system 420) may continue to iteratively and dynamically distribute content objects having the first product tag to each of the plurality of product pages having the product tag in descending order of content score and product page score, respectively. The iterative distribution may continue until all of the plurality of content objects (e.g., those stored in database 422) have been assigned or all product pages (e.g., those stored in database 422) have met their respective content thresholds associated with the first product tag.

When no new product page having the selected (e.g., first, second, third, etc.) product tag is available, the method may move to decision block 140. In decision block 140, the system may determine whether a new product tag is available. When the system determines that a new product tag is available, the method may return to step 105, in which the system may assign each product page having a new (e.g., second, third, fourth, etc.) product tag with a respective page score. The method may continue to iteratively and dynamically distribute content objects having the new product tag to each of the plurality of product pages having the new product tag in descending order of content score and product page score, respectively. The iterative distribution may continue until all of the plurality of content objects (e.g., those stored in database 422) have been assigned or all product pages (e.g., those stored in database 422) have met their respective content thresholds associated with the new product tag. When the system determines that no new product tags are available, method 100 may end.

Figure 2:
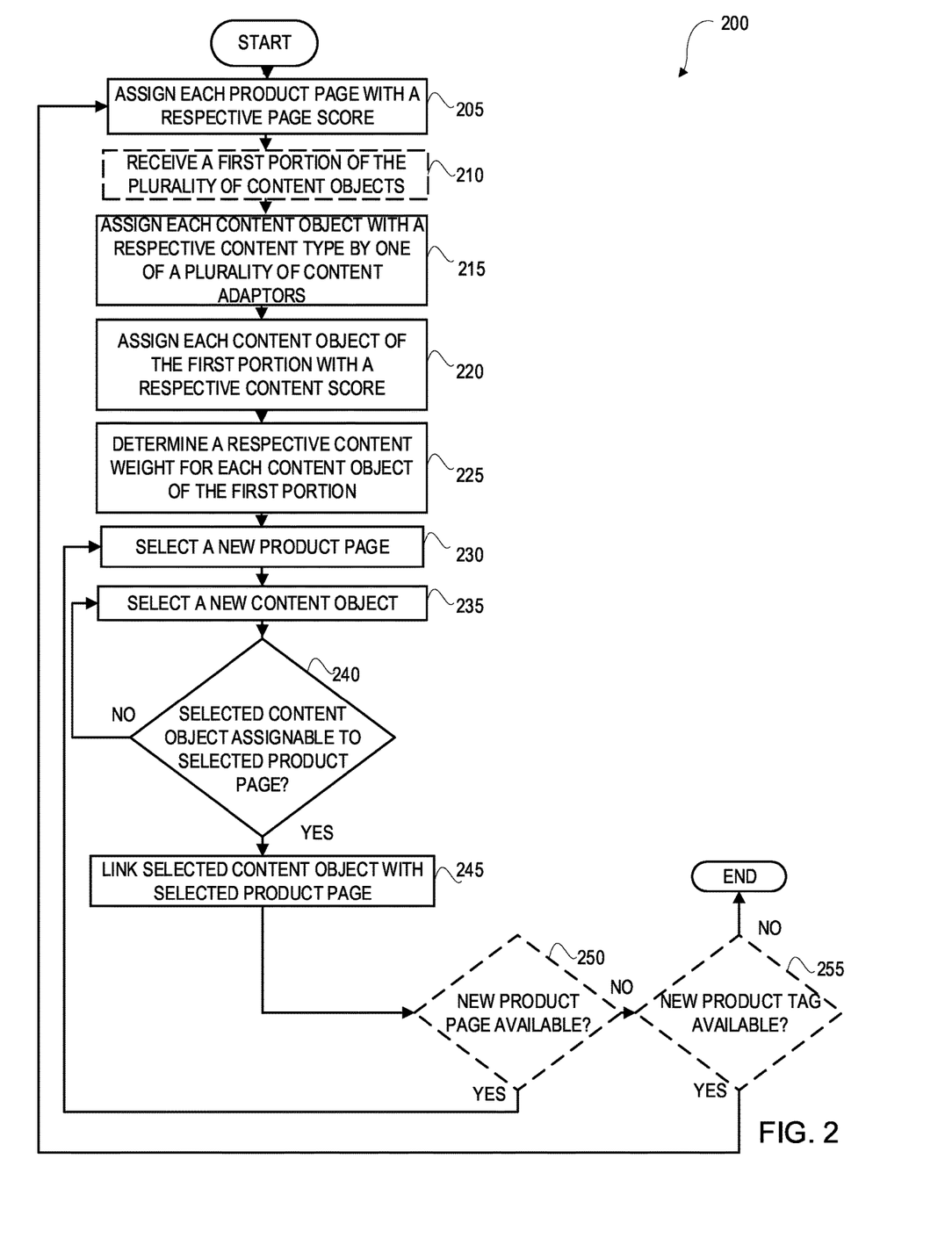
FIG. 2 is a flowchart of an exemplary method for assigning content objects a content type by a respective content adaptor and dynamically linking the content object with a product page.

FIG. 2 is a flowchart of an exemplary method for assigning content objects a content type by a respective content adaptor and dynamically linking the content object with a product page. Some of the steps described in method 200 are similar to those described with respect to method 100. Instead of repeating the descriptions of such steps, they will be omitted for brevity, with reference instead being made to the earlier description of method 100. In step 205 of method 200, the system (e.g., dynamic content distribution system 420) may assign each product page having a first product tag a respective page score. Step 205 is similar to step 105 of method 100. Method 200 may then move to optional step 210 in which the system may receive a first portion of a plurality of content objects. For example, the system (e.g., dynamic content distribution system 420) may have a plurality of data stores (e.g., database 422) configured to store both a plurality of product pages associated with one or more product tags that will be assigned content objects having a matching product tag. The data store may be configured to store a plurality of content objects that may be received from one or more external sources (e.g., third party servers 440 and/or user device 430 described in more detail with respect to FIG. 4). Alternatively, the plurality of content objects may already be present in the data store, in which case step 210 may be skipped. In some embodiments, the system implementing method 200 may include a plurality of content adaptors. The plurality of content adaptors may be configured to continuously monitor for and categorize the plurality of content objects as they are received by the second data store. In some embodiments, the plurality of content adaptors may categorize the plurality of content objects as they are received by assigning a content type to the plurality of content objects as they are received by the system for storage.

In step 215, the system may assign each content object of the of the first portion of the plurality of content objects with a respective content type by one of the plurality of content adaptors. For example, a product review adaptor may be one of the plurality of content adaptors. Continuing the example, the product review adaptor may parse through the received first portion of content objects and determine that a first content object is a product review. This process may be performed by the plurality of content adaptors for each of the received plurality of content objects. Other types of content adaptors may include a related article content adaptor, and/or a reliability data content adaptor.

The content score for each type of content may be calculated by the system in a similar manner. For example, a product review may content object score may be determined based in part on how many words are in the review, whether there are certain key words mentioned in the review (e.g., "Honda" as a keyword for a Honda Accord), and how often those key words appear in the review. In some embodiments, each customer review may include a metric for how many other customers found their review helpful. The content object score for the content object may also include this metric. Additionally, how recently the customer review was generated may factor into the algorithm, with more recent reviews being valued more highly than older customer reviews. Finally, the system may value reviews left by a verified customer more highly than those left by an unverified customer, wherein a verified customer has a preexisting account with the system of has made at least one purchase from the entity associated with the content distribution system. The system may generate a content object score for content objects having a different content type in a similar manner. For example, an article having an associated product tag may have the content score determined based in part on how recently the article was published, the number of unique words in the article, and/or the type of article being published (e.g., an in-depth review of a Honda Civic would score more highly than a "top 10" vehicle article). Similarly, reliability data may be valued in the same way, giving a higher score for more recent submissions and rewarding more detail feedback with a higher content object score.

In some embodiments, the plurality of content adaptors may be part of an integrated content override system. The content override system may include limitations for particular content types. For example, a content object having the content type of a product review supplied by a customer. Generally, the system may have a large number of customer reviews for the products listed in the various product pages, and the customer reviews may provide relatively little value to a respective product page in comparison to more valuable and custom-tailored content, such as an article relating to the product of the product page. Accordingly, the content override system may place a content type limit on a respective product page. For example, the content override system may be employed to limit customer reviews to a maximum of three customer reviews per product page. These relatively low value customer reviews may be used to "fill the gaps" of content throughout the various product pages. Because of their relatively low content object score, without a content override in place, product pages may be overfilled with content objects having the customer product review type. As another nonlimiting example of when a content type may be limited, the system may limit a content type of "Product Title" to just a single content object per respective product page. Accordingly, the system may only allow one content object having a product page title for the product page on any given product page. These limits may be useful to generating custom indicia (as discussed in more detail with respect to FIG. 3) to determine whether custom product page titles are more effective in generating customer interest (e.g., via SEO before/after metric values) than the algorithmically generated titles for the product pages.

In some embodiments, the content override system may additionally assign content objects that have no inherent content weight to a respective product page. In this case, the system (e.g., content distribution system 420) may assign the overridden content object having no weight, and other objects linked to the respective product page would not be displaced to a lower value page. This is because a content object having no weight would not affect the algorithmic distribution of content because the overridden content object would lack a content object weight that would serve to increase the content threshold of the respective product page. Another exemplary use of the content override system may be for including a "link farm override" for a respective product page. Like a title object, the link farm override may have no inherent content object weight and therefore would not displace other content objects assigned to the product page. The link farm override may be employed to guide customers from one product page to a related product page. Link farm overrides may be employed to affect the custom selection indicia (e.g., SEO metrics) for a given product page. For example, a link farm override may be assigned for any page having a particular product tag. The system may assign the link farm override a content weight of zero in order for the link farm override not to "push" content already existing on a respective product page to a lower value product page. Alternatively, content objects being assigned using the content override system may include a respective content weight, in which case lower value content objects assigned to the respective page may be "pushed down" towards product pages having a lower page score and sharing the same product tag(s). Product pages receiving the link farm override may include a hyperlink to another product page or another portion of the website in order to streamline web traffic flow and improve custom selection indicia for each product page (e.g., SEO metrics). In some embodiments, the system (e.g., dynamic content distribution system) may algorithmically generate link farm overrides linking one or more related product pages in order to increase the custom selection indicia (e.g., SEO metrics) for at least one of the linked product pages. Link farm overrides may be algorithmically generated and employed in a manner similar to custom selection indicia testing, as described in more detail with respect to FIG. 3.

In step 220, the system may assign each content object of the received first portion of the plurality of content objects with a respective content score. This process may be similar to that of step 110 of method 100 so a full description is omitted here. In step 225, the system may determine a respective content weight for each content object of the first portion of the received plurality of content objects. The system may use the content weight in order to determine whether a respective content object may be assigned to a respective product page by comparing the content weight to the content threshold associated with the respective product page.

In step 230, the system may select a new product page. The new product page may have the first product tag and a first page score. Depending on which iteration (e.g., first, second, third, etc.) of step 230 the selected product page may be a second, third, fourth, etc. product page. This step is substantially similar to step 115 of method 100, so a full description is omitted here for brevity. In step 235, the system may select a new content object having the same product tag and a first content score. Step 235 is substantially similar to step 120 of method 100, so a full description is omitted here for brevity.

In decision block 240 of method 200, the system may determine whether the selected content object is assignable to the selected product page. This step is substantial similar to step 125 of method 100, so a full description is omitted here for brevity.

The system may determine that the selected content object is assignable to the selected product page when the selected content weight is less than the content threshold associated with the selected product page. In response, the system may dynamically link the selected content object with the selected product page in step 245. When the system determines that the selected content object is not assignable to the selected product page, method 200 may return to step 235. As described above, the system may perform another iteration of steps 235 and 240.

In decision block 250, the system may determine whether a new product page having the selected (e.g., first, second, third, ..., $n^{th}$) product tag is available. When a new product page is available, method 200 may return to step 230, in which the system (e.g., dynamic content distribution system 420) may select a new (e.g., second, third, ..., $n^{th}$) product page and continue iterative linking content objects to the selected product page as described in steps 230-245. When a new product page is not available, the method may advance to decision block 260. Step 250 is substantially similar to step 135 of method 100, so a full description is omitted here for brevity.

In decision block 260, the system may determine whether a new product tag is available. When the system determines that a new product tag is available, the method may return to step 205, in which the system may assign each product page having a new (e.g., second, third, fourth, etc.) product tag with a respective page score. When the system determines that no new product tags are available, method 200 may end. Step 260 is substantially similar to step 140 of method 100, so a full description is omitted here for brevity.

Figure 3:
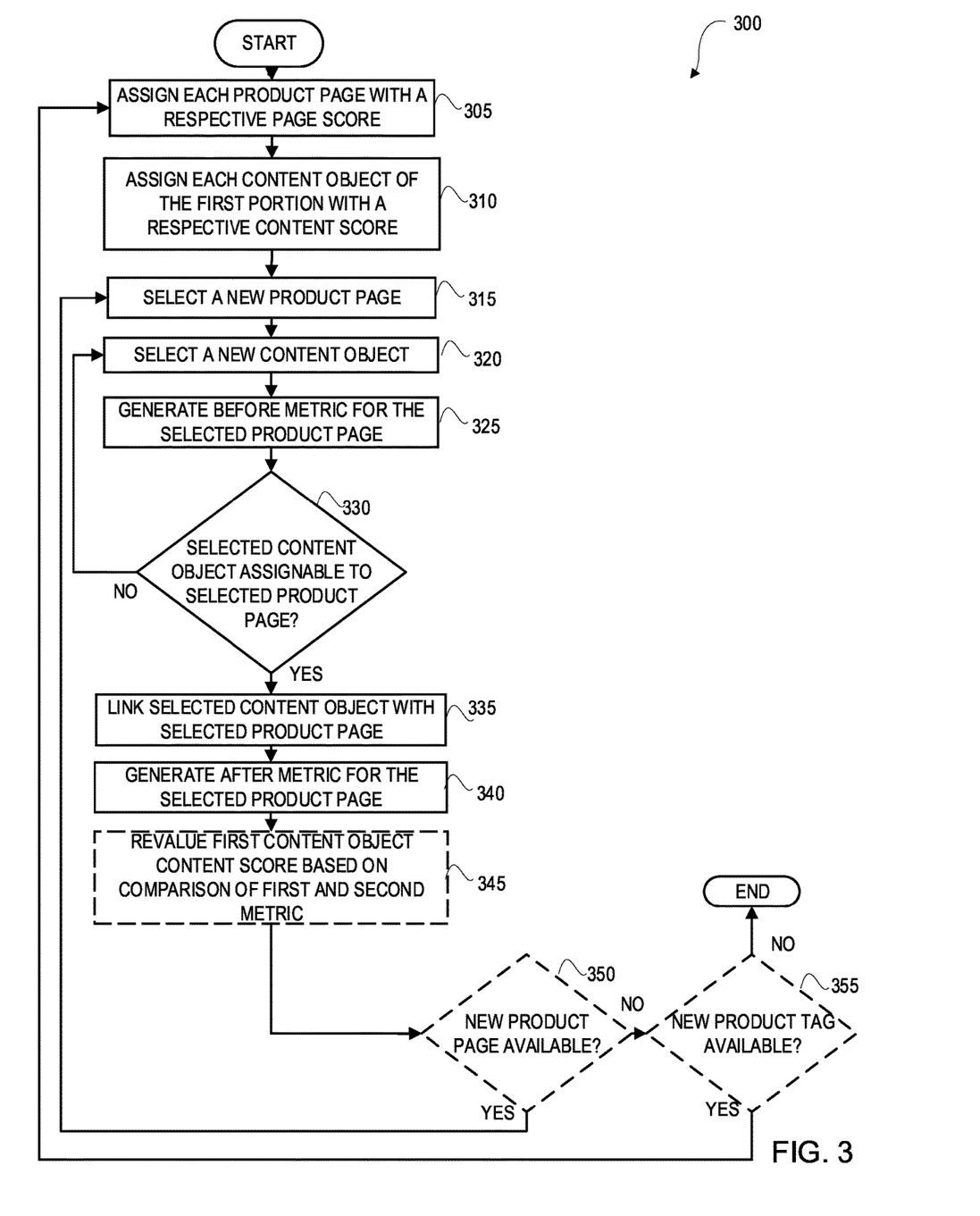
FIG. 3 is a flowchart for a further exemplary method for dynamically linking a content object with a product page and evaluating the effect of linking the content object with a generated metric.

FIG. 3 is a flowchart for a further exemplary method for dynamically linking a content object with a product page and evaluating the effect of linking the content object with a generated metric. Some of the steps described in method 300 are similar to those described with respect to method 100. Instead of repeating the descriptions of such steps, they will be omitted for brevity, with reference instead being made to the earlier description of method 100. Steps 305, 310, 315, and step 320 are substantially similar to steps 105, 110, 115, and 120 of method 100, respectively, and their description will be omitted here for brevity.

In step 325, the system (e.g., dynamic content distribution system 420) may generate a "before" metric for the selected product page. For example, the "before" metric may be based on a first custom selection indicia. For example, the "before" metric may be used to determine quantify web traffic to the first product page. This information may be used by the system to determine the relative value of assigning particular content objects to the plurality of product pages. In some embodiments, the system may compare the value of the "before" metric to the value of an "after" metric, wherein the "after" metric may be generated after assigning an additional content object to a respective product page. Accordingly, the system may utilize the comparison of metrics to verify whether content objects assigned a high content score are actually as valuable as initially determined by the system in step 310. For example, content objects having a high content score should produce a large upward trend in web traffic to the product page to which it is assigned. Accordingly, comparing a first metric generated before a respective content object is assigned to a second metric generated after a product page is assigned a respective content object allows the system to evaluate whether the respective content object has been properly scored, or whether the content score should be adjusted based on the comparison of the first and second metric.

In some embodiments the system may be configured to algorithmically generate tests to determine changes that may be made to any of the one or more product pages in order to generate more interest, drive a higher click-through rate, result in a higher purchase rate, etc. First, the system (e.g., dynamic content distribution system 420) may analyze existing custom selection indicia for each product page (e.g., SEO values) to determine two unique product pages having similar characteristics (e.g., total sales volume, click-through rate, etc.). The system may employ the test using the content override system described above. For example, the system may generate a hypothesis that instead of the standard "Used 'Make/Model' near you" title associated with the Honda Civic product page, a title such as "Find Your Used 'Make/Model' today" may be more effective in driving overall purchases. The system may determine that the page associated with Toyota Corollas is similar to the Honda Civic according to one or more custom selection indicia (e.g. SEO value, actual purchase volume, etc.) and may initiate the test by modifying the title content object associated with the Honda Civic page with a content override. The content override may have an inherent content weight of 0 so that no other content objects are displaced from the respective product page. The system may monitor various custom selection indicia over time for the modified Honda Civic page and the Toyota Corolla page, which may be used as a control group for the test. Based on the results, the system may generate a recommendation to set the content override content as the standard for product pages similar (e.g., by custom selection indicia) to the test page (e.g. the Honda Civic page in the example above). Because the dynamic content distribution system algorithmically distributes content including the generated tests, the system may employ a maximum density of tests at any given time. More specifically, the system may determine the page score for each product page as described in more detail in blocks 105, 205, and 305 of FIG. 1, FIG. 2, and FIG. 3, respectively and may use the generated hierarchy of product pages to identify similarly positioned product pages and use the identified product page pairs to employ the testing with one of the product page pairs serving as a control.

In decision block 330, the system may determine whether the selected content object is assignable to the selected product page by comparing a selected content weight associated with the selected content object to a content threshold associated with the selected product page. When the selected content weight is less than the content threshold, the system may dynamically link the selected content object with the selected product page in step 335. When the first content object is not assignable to the first product page, method 300 may return to step 320, as described above in reference to step 120 of method 100.

After dynamically linking the first content object with the first product page in step 335, the method may include generating an "after" (e.g., a second) metric for the selected product page in step 340. In step 345, the method may include revaluing the selected content object content score based on a comparison of the "before" metric and the "after" metric. For example, if a comparison of a "before" and "after" metrics do not show that the respective content object assigned to the product page has sufficiently increased web traffic to the product page, the system may revalue the first content object content score to be lower because of the comparison.

After step 345, method 300 may advance to decision block 350. Steps 350 and 355 of method 300 are substantially similar to those of steps 135 and 140 of method 100, respectively, and therefore a complete description is omitted here for brevity. As described in reference to methods 100 and 200, the system (e.g., dynamic content distribution system 420) may continue to iteratively and dynamically link the plurality of content objects each associated with a respective product tag to the plurality of product pages each associated with the respective product tag until (i) each of the plurality of content objects have been assigned to a respective page or (ii) each of the plurality of product pages meets a respective content threshold. The linking may be repeated for a second, third, . . . , $n^{th}$ product tag until product pages and content objects having the second, third, . . . , $n^{th}$ product tag have all been assigned as described above.

Figure 4:
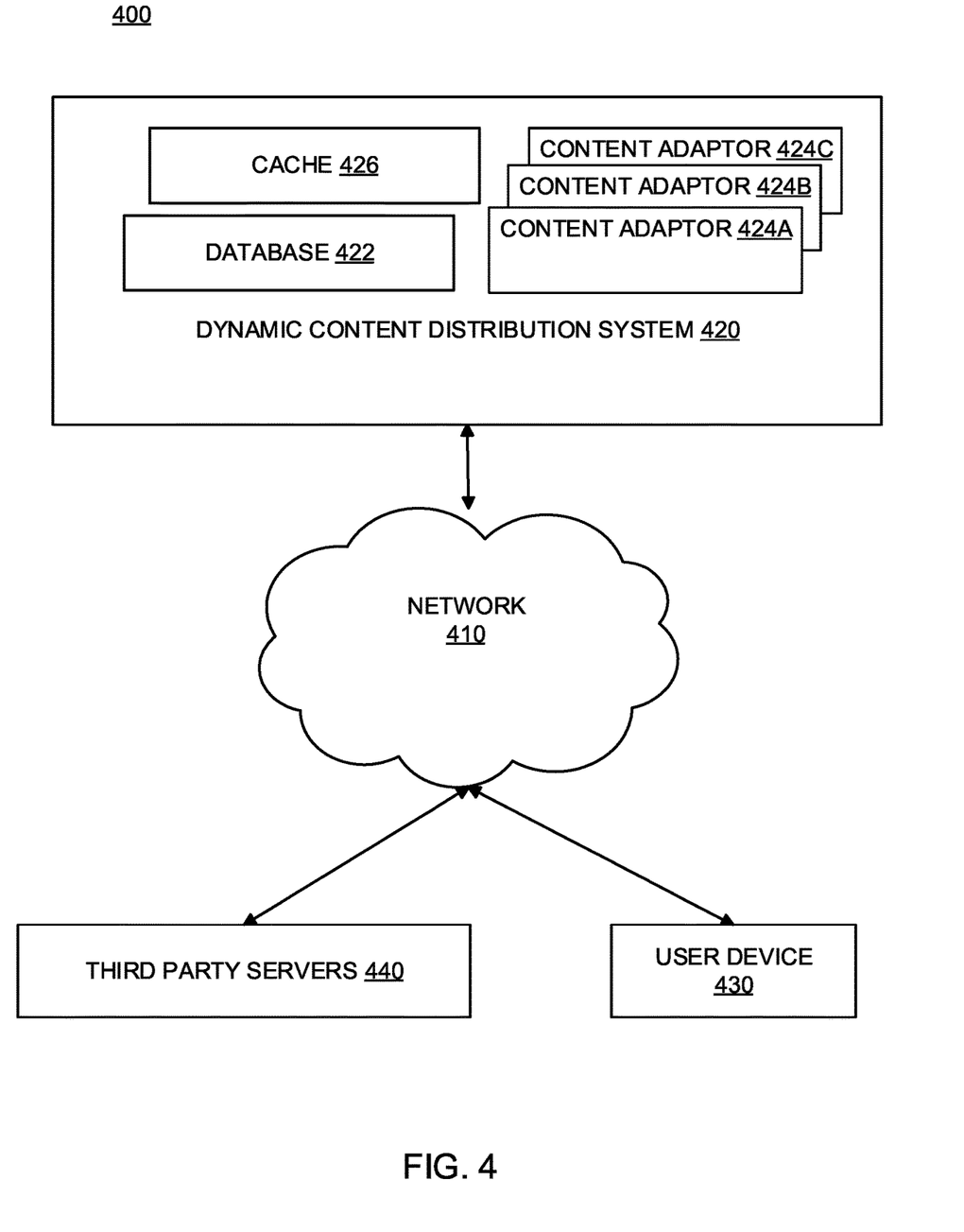
FIG. 4 is a diagram of a system for dynamically linking a content object to a product page according to an exemplary implementation of the disclosed technology.

FIG. 4 is a diagram of dynamic content distribution system 400, according to an exemplary implementation of the disclosed technology. The components and arrangements shown in FIG. 4 are not intended to limit the disclosed invention as the components used to implement the disclosed processes and features may vary. As shown, system 400 may include dynamic content distribution system 420, which may serve as the central processor enabling or facilitating the methods disclosed herein, along with one or more third party servers 440, user device 430, and a network 410. Dynamic content distribution system 420 may be in communication with user device 430 and one or more third party servers 440 via network 410 and in direct (as shown) or indirect (e.g., via network 410 or another network or device) communication with database 422, cache 426, and one or more content adaptors 424A-C. In operation and in some embodiments, dynamic content distribution system 420 may receive content objects (e.g., from user device 430) having a content type of a customer review. For example, a customer associated with the user device may review a product and submit the customer review. The customer review may be received by the data store (e.g., database 422) as a content object and analyzed by one or more of the content adaptors (e.g., content adaptors 424A-C). The customer review adaptor(s) 424A-C may identify the received content object with the appropriate content type. In some embodiments, content objects are received from a third-party server (e.g., third party servers 440), which are analyzed by the system as described in more detail with respect to exemplary methods 100, 200, and 300.

Network 410 may be of any suitable type, including individual connections via the internet such as cellular or WiFi networks. In some embodiments, network 410 may connect terminals using direct connections such as radio-frequency identification (RFID), near-field communication (NFC), Bluetooth®, low energy Bluetooth® (BLE), WiFi™, ZigBee®, ambient backscatter communications (ABC) protocols, USB, or LAN.

Dynamic content distribution system 420 may include a database 422, which may be composed of a single database, or a distributed database system. Database 422 may be configured to receive and/or store a plurality of content objects and a plurality of product pages, allowing the dynamic content distribution system 420 to dynamically and iteratively link the plurality of product pages having a specific product tag with one or more content objects having the same product tag, in descending order of priority. The system (e.g., dynamic content distribution system 420) may determine among the plurality of product pages and the plurality of content objects based on the respective content scores of the plurality of content objects and the respective page scores of the plurality of product pages. In some embodiments, each product page may have an independent page score for each product tag assigned to the respective product page. Similarly, the system (e.g., content adaptors 424A-C) may assign each content object an independent content score for each product tag assigned to the respective content object. In some embodiments, dynamic content distribution system 420 may assign a priority queue among the product tags, such that content objects assigned with a high priority product tag are iteratively distributed to the available plurality of product pages having the same priority product tag before moving on to product tags with a lower priority. In response to dynamic content distribution system 420 linking a respective content object with a respective product page, dynamic content distribution system 420 may transfer the linked content object to cache 426, which the system 400 (e.g., dynamic content distribution system 420) may use to populate the respective product pages with the various linked content objects. Dynamic content distribution system 420 and user device 430 may each include one or more mobile computing devices (e.g., tablet computers or portable laptop computers) or stationary computing devices (e.g., stationary desktops), and have components and functionalities as described in more detail with respect to FIG. 5. Both user device 430 and dynamic content distribution system 420 may comprise more or fewer of the components disclosed in FIG. 5, enabling both the user device 430 and the dynamic content distribution system 420 to perform the steps of dynamically linking content objects to product pages.

Figure 5:
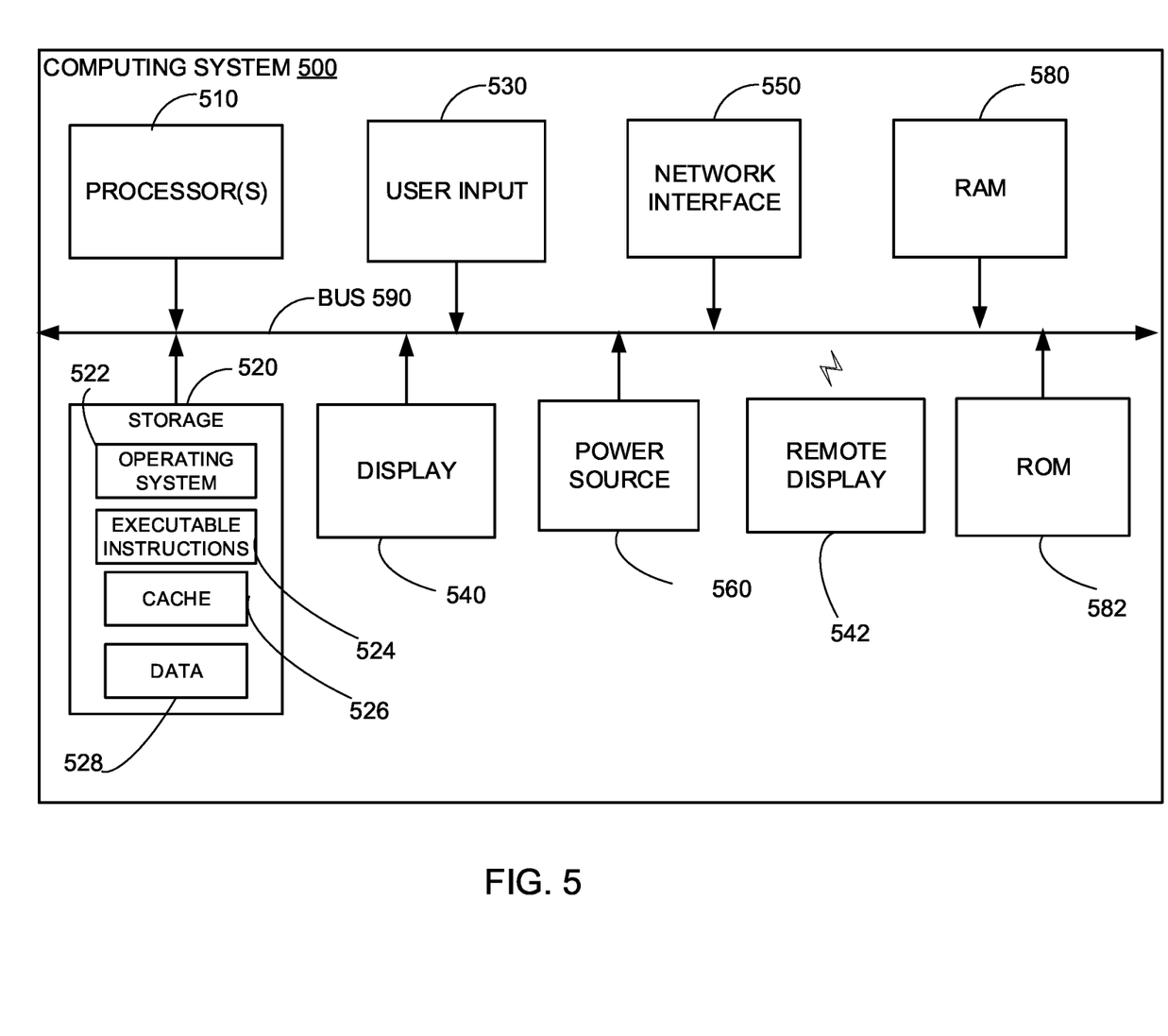
FIG. 5 depicts a computing system architecture according to an exemplary implementation of the disclosed technology.

A computing device architecture 500 is illustrated in FIG. 5, and implementations of the disclosed technology may include a computing device with more or fewer components than those shown. It will be understood that computing device architecture 500 is provided for example purposes only and does not limit the scope of the various implementations of the present disclosed systems, methods, and computer-readable mediums.

As shown, computing device architecture 500 may include a central processing unit (CPU) 510, where computer instructions may be processed; a display interface 540 that supports a graphical user interface and provides functions for rendering video, graphics, images, and texts on the display. In certain example implementations of the disclosed technology, display interface 540 may connect directly to a local display, such as a desktop monitor. In another example implementation, display interface 542 may be configured for providing data, images, and other information for an external/remote display that is not necessarily physically connected to the computing device 500 (e.g., when dynamic content distribution system 420 performs substantially all steps of one of methods 100, 200, or 300, and user device 430 acts as remote display 542). For example, a desktop monitor or a user's mobile device (e.g. user device 430) may be utilized for mirroring graphics and other information that is requested from remote server. In certain example implementations, display interface 542 wirelessly communicates, for example, via a Wi-Fi channel, Bluetooth connection, or other available network connection interface 550 to the external/remote display.

In an example implementation, network connection interface 550 may be configured as a wired or wireless communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, another like communication interface, or any combination thereof.

Computing device architecture 500 may include a user input 530 that provides a communication interface to a physical or virtual keyboard. Computing device architecture 500 may be configured to use one or more input components via one or more of input/output interfaces (for example, keyboard interface 530, display interface 540, network connection interface 550, etc.) to allow computing device architecture 500 to present information to a user and capture information from a device's environment including instructions from the device's user. The input components may include a mouse, a trackball, a directional pad, a track pad, a touch-verified track pad, a presence-sensitive track pad, a presence-sensitive display, a scroll wheel, a digital camera, a digital video camera, a web camera, and the like. Additionally, an input component may be integrated with the computing device architecture 500 or may be a separate device.

In example implementations, network connection interface 550 may support a wireless communication interface to a network (e.g., network 410). As mentioned above, display interface 540 may be in communication with network connection interface 550, for example, to provide information for display on a remote display 542 that is not directly connected or attached to the system. According to example implementations, a random-access memory (RAM) 580 may be provided, where computer instructions and data may be stored in a volatile memory device for processing by the processor(s) 510.

According to example implementations, computing device architecture 500 may include a read-only memory (ROM) 582 where invariant low-level system code or data for basic system functions such as basic input and output (I/O), startup, or reception of keystrokes from a keyboard may be stored in a non-volatile memory device. According to example implementations, computing device architecture 500 may include a storage medium 520 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), for storing files including an operating system 522, application programs (including, for example, a web browser application, a widget or gadget engine, and or other applications, as necessary), executable instructions 524 (including stored programs that enable various operations of the method such as an API which may, for example, allow user device 430 to communicate with one or more components of dynamic content distribution device 420 that perform the steps of one of methods 100, 200, or 300), cache 526 (e.g., cache 426) configured to store the plurality of content objects that have already been dynamically linked to one of the plurality of product pages, and data files 528, which may include images and metadata corresponding to a product type. According to example implementations, computing device architecture 500 may include a power source 560 that may provide an appropriate alternating current (AC) or direct current (DC) to power components.

According to an example implementation, processor 510 may have appropriate structure to be a computer processor. In one arrangement, processor 510 may include more than one processing unit. RAM 580 may interface with a computer bus 590 to provide quick RAM storage to the processor 510 during the execution of software programs such as the operating system, application programs, and device drivers. More specifically, processor 510 may load computer-executable process steps from storage medium 520 or other media into a field of RAM 580 to execute software programs. Data may be stored in RAM 580, where computer processor 510 may access data during execution. In one example configuration, and as will be understood by one of skill in the art, computing device architecture 500 may include sufficient RAM and flash memory for carrying out processes relating to the disclosed technology.

Storage medium 520 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media may allow a computing device to access computer-executable process steps, application programs and the like, stored on removable and non-removable memory media, to off-load data from the device or to upload data onto the device. A computer program product, such as one utilizing a dynamic content distribution system, may be tangibly embodied in storage medium 520, which may include a non-transitory, machine-readable storage medium.

According to example implementations, the term "computing device," as used herein, may be a processor, or conceptualized as a processor (for example, processor 510 of FIG. 5). In such example implementations, the computing device (processor) may be coupled, connected, and/or in communication with one or more peripheral devices, such as display 540 and/or external display 542.

In example implementations of the disclosed technology, a computing device includes any number of hardware and/or software applications that are executed to facilitate any of the operations. In example implementations, one or more user input interfaces 530 may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, etc., may facilitate user interaction with the computing device. The one or more user input interfaces 530 may be utilized to receive or collect data and/or user instructions from a wide variety of input devices. Received data may be processed by one or more computer processors 510 as desired in various implementations of the disclosed technology and/or stored in one or more memory devices, such as storage medium 520.

One or more network interfaces 550 may facilitate connection of the computing device inputs and outputs to one or more suitable networks and/or connections. For example, the connections that facilitate communication with any number of sensors associated with the system. The one or more network interfaces 550 may further facilitate connection to one or more suitable networks; for example, a local area network, a wide area network, the Internet, a Wi-Fi enabled network, a satellite-based network, any wired network, any wireless network, etc., for communication with external devices and/or systems.

Exemplary Use

Example implementations of the disclosed technology can provide systems and methods for iteratively and dynamically linking a plurality of content objects each associated with a first product tag to a plurality of product pages each associated with the first product tag in descending order of content and page priority, respectively, until (i) each of the plurality of content objects have been assigned to a respective page or (ii) each of the plurality of product pages meets a respective content threshold. The following example implementations are intended solely for explanatory purposes and are intended to be non-limiting.

In one example, the system (e.g., dynamic content distribution system 420) may have already assigned each of the plurality of content objects having a first product tag to the one of the plurality of product pages in descending order of priority based on the respective content scores and product page scores. However, the data store may receive a new portion of content objects also having the first product tag, and the dynamic content distribution system may iteratively revalue the content score of each of the plurality of content objects stored within the data store, including the previously existing content objects and the content objects received as port of the new portion of content objects. Accordingly, the dynamic content distribution system may determine a new priority for all the content objects. For example, one of the newly received content objects may have a higher content score than any of the previously existing content objects. In this case, the dynamic content distribution system may assign the content having the highest content score to the product page having the highest page score. This may result in new content showing up on each respective product page based on the new values of the content scores of the plurality of content objects being assigned. Having new, high value content appear on high priority product pages is advantageous for several reasons. Naturally, merchants wish to maximize online sales, and by continuously linking high value content to relevant high priority product pages, merchants can maximize product sales through the interest generated by assigned content without devoting intensive man-hours towards manually updating product pages with relevant content objects. Alternatively, when the system (e.g., dynamic content distribution system 420) has not already assigned each of the plurality of content objects, the system may begin by first assigning each product page with respective page score and assigning each content object with a respective content score, selecting a highest priority product page and content object, and continue to dynamically and iteratively link content objects to product pages according to their product tags.

In another example, the system may use the metrics generated as described in exemplary method 300 in order to automatically and dynamically revalue each content object assigned to a product page to determine a new content score. The system (e.g., dynamic content distribution system 420) may generate the new content score based on a comparison of the first metric and the second metric. The comparison may indicate a change in consumer interest in a product associated with a respective product page based on the addition of a particular content object. The first metric may be indicative of consumer interest before the addition of the content object and the second metric may be indicative of consumer interest after the addition of the respective content object. Methods of generating metrics associated with consumer interest provide numerous advantages over currently employed systems. For example, by generating a metric both before and after dynamic content distribution system assigns a content object to a respective product page, the system may quantify the effect of the respective content object on consumer sales of the product associated with the respective product page. Accordingly, the dynamic content distribution may revalue a content object if, for example, the metric comparison reveals that the respective content object is not driving consumer sales and reassign the content object to a lower priority product page, allowing the system to fill the high priority product page with a content object more effective at driving consumer sales.

In some examples, the system may generate a priority queue for the various product tags associated with the content objects and the product pages. Accordingly, the dynamic content distribution may iteratively and dynamically assign content objects having the product tag of the highest priority assigned first to the product pages having the same product tag before continuing the process for content objects and product pages having a lower priority product tag. Generating a priority queue as described herein may be associated with numerous advantages over current systems. For example, a merchant may already know which products are responsible for the highest revenues and may wish to prioritize product pages for products having a product tag associated with these high value products. Dynamic content distribution system may automatically generate the priority queue based on collected sales data to prioritize distributing content objects to product pages having a high priority product tag. If a particular product page and/or content object is associated with more than one product tag, the system may determine which product tag to prioritize based on the generated priority queue.

The exemplary systems described herein provide a number of technological advantages over existing methods of managing content distribution, such as the ability to dynamically update the associated content scores and product page scores in substantially real-time allowing the dynamic content distribution system to optimize the highest priority product pages by linking the highest value content objects and updating which content objects appear on the product pages as the content scores are updated in substantially real-time monitor or track every source website from which the products are ingested by the system. For example, the system may dynamically receive a new content object and revalue the content scores of all the content objects and redistribute the content objects to matching product pages in descending order of content score automatically, without human intervention. Current content management systems require a merchant to manually select what content will appear on a particular product page, and tools for limiting repeats of particular content objects on more than one pages are either cumbersome or unavailable. Regardless, current content distribution systems suffer from being slow to assign new content to product pages, are cumbersome to use, and less accurate than using a system capable of automatically determining priorities among content objects and product pages, such as dynamic content distribution system 420.

The present disclosure relates to system and methods for dynamically linking content objects to product pages and more particularly a content distribution system configured to assign page scores to a plurality of product pages and content scores to a plurality of content objects, selecting a product page having a first product tag and a first page score, selecting a content object having the first product tag and a first content score, and dynamically linking the respective content object to the product page when a first content weight is less than a first content threshold associated with the respective product page. For example, the content distribution system may be used to algorithmically update a page having a specific product tag identifier with relevant content associated with the same product tag. Additionally, each content object and product page is ranked such that a highest value content object associated with a specific product tag may be dynamically linked to a highest value product page associated with the same product tag when the product page content threshold has not been met. When the first product page content threshold has been met, the system may select a second product page having the same product tag, determine whether the second product page content threshold has been met, and when it has not, dynamically link the highest value content object to the second product page. Alternatively, if the first product page content has not been met, but the content distribution system determines that the respective content weight of the highest value content object is more than the first content threshold, the system may select a second content object associated with the product tag, determine whether the content weight of the second content object is less than the first content threshold, and dynamically link the second content object with the first product page when the weight of the second content object is less than the first content threshold. The content distribution system may be configured to continue iteratively and dynamically linking the plurality of content objects each associated with a first product tag to the plurality of product pages each associated with the first product tag until each of the plurality of content objects have been assigned to a respective page or each of the plurality of product pages meet a respective content threshold.

For example, an exemplary content distribution system may be configured to perform the following steps. The system may include one or more processors, a first data store including a plurality of product pages, wherein each product page of the plurality of product pages is associated with a product tag, a page score, and a content threshold. The system may further include a second data store including a plurality of content objects, wherein each of the plurality of content objects includes one or more product tags, a content score, a content, and a content weight. The system may further include a memory in communication with the one or more processors and storing instructions to perform the following steps of a method. The exemplary method may include assigning each product page with a respective page score and assigning each content object with a respective content score. The method may include selecting a first product page having the first product tag and a first page score, and selecting a first content object having the first product tag and a first content score. The method may include comparing a first content weight associated with the first content object to a first content threshold associated with the first product page to determine whether the first content object may be assigned to the first product page. When the first content weight is less than the first content threshold, the method may conclude by dynamically linking the first content object with the first product page.

In some embodiments, when the first content weight is not less than the first content threshold, the method may further include selecting a second content object having the first product tag and having a second content score and a second content weight, determining that the second content weight is less than the first content threshold, and dynamically linking the second content object to the first product page.

In some embodiments, the method may further include selecting a third content object having the first product tag of the plurality of content objects associated with the first product tag, wherein the third content object further includes a third content score and a third content weight. The method may include determining that the first content threshold has been met, and selecting a second product page having a first product tag, and a second page score of the plurality of product pages associated with the first product tag. After the selection, the method may include comparing the third content weight associated with the third content object to a second content threshold associated with the second product page to determine whether the second product page may be assigned the third content object. When the third content weight is less than the second content threshold, the method may include dynamically linking the third content object with the second product page.

In some embodiments, the method may further include continuing to iteratively and dynamically linking the plurality of content objects each associated with the first product tag to the plurality of product pages each associated with the first product tag until (i) each of the plurality of content objects have been assigned to a respective page or (ii) each of the plurality of product pages meets a respective content threshold. In some embodiments, the system may perform the same process for a second product tag, a third product tag, and so on, until each of the plurality of content objects have been assigned to a respective page or each of plurality of product pages meets a respective content threshold for content objects and product pages associated with the second product tag, the third product tag, etc.

In some embodiments, the first page score is indicative of a higher value page than the second page score, the first content score is indicative of a higher value content object than the second content score, and the second content score is indicative of a higher value content object than the third content score, wherein pages and content objects are dynamically linked in descending order of value for each respective product tag.

In some embodiments, each assigned content object brings the respective page closer to the respective content threshold based on a value of the content score associated with the assigned content.

In another aspect, a dynamic content distribution system is disclosed. The dynamic content distribution system may be configured to perform steps of a method as follows. The system may include one or more processors, a first data store comprising a plurality of product pages, wherein each product page of the plurality of product pages is associated with one or more product tags, a page score, and a content threshold. The system may further include a second data store configured to store a plurality of content objects, wherein each of the plurality of content objects comprise one or more product tags, a content type, a content score, a content, and a content weight. The system may further include a plurality of content adaptors configured to continuously monitor for and categorize the plurality of content objects they are received by the second data store. Finally, the system may include memory in communication with the one or more processors storing instructions configured to cause the system to perform the following steps. The method may include assigning each product page with a respective page score. Next, the method may include receiving a first portion of the plurality of content objects. The method may include assigning each content object of the first portion with a respective content type by one of a plurality of content adaptors. The method may then include assigning a respective content weight for each content object of the first portion, the respective content weight based in part on the content type and the respective content score. The method may include selecting a first product page having a first product tag and a first page score and selecting a first content object having the first product tag and a first content score. Then, the system may compare a first content weight associated with the first content object to a first content threshold associated with the first product page to determine whether the first content object may be assigned to the first product page. When the first content weight is less than the first content threshold, the method may include dynamically linking the first content object with the first product page.

In some embodiments, when the first content weight is more than the first content threshold, the method may include selecting a second content object having the first product tag, a second content score, and a second content weight. The content score may be indicative of a higher value content object than the second content score. The method may include comparing the second content weight associated with the second content object to the first content threshold to determine whether the second content object may be assigned to the first product page. The method may include dynamically linking the second content object with the first product page.

In some embodiments, in response to determining that the first content weight is more than the first content threshold, the method may include identifying a second content object having the second product tag, selecting a second content object having the second product tag, determining that a second content weight associated with the second content object is less than the second content threshold and dynamically linking the second content object with the first product page.

In some embodiments, content objects associated with the first product tag are prioritized over content objects associated with the second product tag such that pages and content objects are dynamically linked in descending order of value for the first product tag before dynamically linking pages and content objects in descending order for the second product tag.

In some embodiments, the method may include generating a metric score associated with a custom selection indicia for each content object dynamically linked to one of the plurality of product pages. In some embodiments, the custom selection indicia further comprises a search engine optimization click-through rate.

In some embodiments, the content threshold is based in part on the content type assigned to a respective product page.

In another aspect, a dynamic content distribution system is disclosed. The system may include a first data store including a plurality of product pages, wherein each product page of the plurality of product pages is associated with a product tag, a page score, and a content threshold. The system may include a second data store comprising a plurality of content objects, wherein each of the plurality of content objects comprises one or more product tags, a content score, a content and a content weight. The system may also include a memory in communication with the one or more processors and storing instructions configured to cause the system to perform the following steps of a method. The method may include assigning each product page with a respective page score and assigning each content object with a respective content score. The method may include selecting a first product page having a first product tag and a first page score, and selecting a first content object having the first product tag and a first content score. The method may include generating a first metric for the first product page based on a first customer selection indicia. Then, the method may include comparing a first content weight associated with the first content object to a first content threshold associated with the first product page to determine whether the first content object may be assigned to the first product page. When the first content weight is less than the first content threshold, the method may include dynamically linking the first content object with the first product page. The method may include generating a second metric based on a second custom selection indicia. The second custom selection indicia may be based in part on linking the first content object with the first product page. Finally, the method may include revaluing the first content object content score based on a comparison of the first metric and the second metric.

In some embodiments, the custom selection indicia further includes a search engine optimization click-through rate.

In some embodiments, when the first content weight is not less than the first content threshold, the method may include selecting a second content object having the first product tag and having a second content score and second content weight and determining that the second content weight is less than the first content threshold. Responsive to the determination, the method may include dynamically linking the second content object with the first product page.

In some embodiments, the method may further include selecting a third content object having the first product tag of the plurality of content objects associated with the first product tag. The third content object may further include a third content score and a third content weight. The method may include determining the first content threshold has been met. Responsive to determining that the first content threshold has been met, the method may include selecting a second product page having a first product tag and a second page score of the plurality of product pages associated with the first product tag. The method may include comparing the third content weight associated with the third content object to a second content threshold associated with the second product page to determine whether the second product page may be assigned the third content object. When the third content weight is less than the second content threshold, the method may include dynamically linking the third content object with the second product page.

In some embodiments, the method may include continuing to iteratively and dynamically link the plurality of content objects each associated with the first product tag to the plurality of product pages each associated with the first product tag until (i) each of the plurality of content objects have been assigned to a respective page or (ii) each of the plurality of product pages meets a respective content threshold.

In some embodiments, the first page score is indicative of a higher value page than the second page score, and the first content score is indicative of a higher value content object than the second content score, and the second content score is indicative of a higher value content object than the third content score. Additionally, the pages and content objects may be dynamically linked in descending order of value for each respective product tag. In some embodiments, the content threshold is based in part on the content type assigned to a respective product page.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for dynamically rearranging content on a plurality of product web pages accessible via a computer system, the method comprising:
   receiving, via a graphical user interface, first data corresponding to content objects displayed on one or more web pages;
   selecting a plurality of content objects associated with a first product tag based on the first data;
   determining a placement score and a placement weight for each of the plurality of content objects;
   selecting a first product web page of a plurality of product web pages to be populated with content associated with the first product tag, each of the plurality of product web pages having a current page weight limit indicative of available space for content;

prioritizing the plurality of content objects based at least in part on a placement score of each of the plurality of content objects into a first order;
selectively assigning a first subset of the plurality of content objects to the first product page in the first order based at least in part on a comparison of a placement weight associated with each of the first subset of the plurality of content objects and the current page weight limit of the first product page;
dynamically updating the graphical user interface to display the first subset of the plurality of content objects in the first order on the first product page;
receiving, via the graphical user interface, click data;
generating, using the click data, a click-through-rate for each of the plurality of web pages having the first subset of the plurality of content objects over a predetermined period of time; determining an improvement in a usage score of the first product page having the first subset of the plurality of content objects based on the click-through-rate;
automatically updating the placement score of each of the first subset of the plurality of content objects based on the improvement;
selecting a second product web page of the plurality of product web pages to be populated with content associated with the first product tag;
prioritizing the plurality of content objects into a second order based at least in part on the updated placement score of each of the first subset of the plurality of content objects;
selectively assigning a second subset of the plurality of content objects to the second product web page in the second order based at least in part on a comparison of a placement weight associated with each of the second subset of the plurality of content objects and the current page weight limit of the second product web page; and
dynamically updating the graphical user interface to display the second subset of the plurality of content objects in the second order on the second product web page.

2. The method of claim 1, wherein each of the content objects comprise an object type selected from a reliability data content object, a related article content object, and a product review content object.

3. The method of claim 2, wherein prioritizing the plurality of content objects is based at least in part on the object type of each of the plurality of content objects.

4. The method of claim 1, wherein determining the placement score for each of the plurality of content objects further comprises:
scoring each content object of the plurality of content objects with a first score based on how recently each respective content object was generated;
scoring each content object of the plurality of content objects with a second score based a number of words contained within each respective content object; and
summing the first score and the second score for each content object of the plurality of content objects to determine the placement score.

5. The method of claim 1, wherein the usage score of the first product page is greater than the usage score of the second product page, and the first product page is populated with content objects before the second product page based on the usage score of the first product page being greater than the usage score of the second product page.

6. A system comprising:
one or more processors;
and a memory in communication with the one or more processors and storing instructions that, when executed by the one or more processors, are configured to cause the system to:
receive, via a graphical user interface, first data corresponding to content objects displayed on one or more web pages;
select a plurality of content objects associated with a first product tag based on the first data;
determine a placement score and a placement weight for each of the plurality of content objects;
select a first product web page of a plurality of product web pages to be populated with content associated with the first product tag, each of the plurality of product web pages having a current page weight limit indicative of available space for content;
prioritize the plurality of content objects based at least in part on a placement score of each of the plurality of content objects into a first order;
selectively assign a first subset of the plurality of content objects to the first product page in the first order based at least in part on a comparison of a placement weight associated with each of the first subset of the plurality of content objects and the current page weight limit of the first product page;
dynamically update the graphical user interface to display the first subset of the plurality of content objects in the first order on the first product page;
receive, via the graphical user interface, click data;
generate, using the click data, a click-through-rate for each of the plurality of web pages having the first subset of the plurality of content objects over a predetermined period of time;
determine an improvement in a usage score of the first product page having the first subset of the plurality of content objects based on the click-through-rate;
automatically update the placement score of each of the first subset of the plurality of content objects based on the improvement;
select a second product web page of the plurality of product web pages to be populated with content associated with the first product tag;
prioritize the plurality of content objects into a second order based at least in part on the updated placement score of each of the first subset of the plurality of content objects;
selectively assign a second subset of the plurality of content objects to the second product web page in the second order based at least in part on a comparison of a placement weight associated with each of the second subset of the plurality of content objects and the current page weight limit of the second product web page; and
dynamically update the graphical user interface to display the second subset of the plurality of content objects in the second order on the second product web page.

7. The system of claim 6, wherein each of the content objects comprise an object type selected from a reliability data content object, a related article content object, and a product review content object.

8. The system of claim 7, wherein prioritizing the plurality of content objects is based at least in part on the object type of each of the plurality of content objects.

9. The system of claim 6, wherein determining the placement score for each of the plurality of content objects further comprises:

scoring each content object of the plurality of content objects with a first score based on how recently each respective content object was generated;

scoring each content object of the plurality of content objects with a second score based a number of words contained within each respective content object; and summing the first score and the second score for each content object of the plurality of content objects to determine the placement score.

10. The system of claim 6, wherein the usage score of the first product page is greater than the usage score of the second product page, and the first product page is populated with content objects before the second product page based on the usage score of the first product page being greater than the usage score of the second product page.

11. A system comprising:
one or more processors;
and a memory in communication with the one or more processors and storing instructions that, when executed by the one or more processors, are configured to cause the system to:
receive, via a graphical user interface, first data corresponding to content objects displayed on one or more web pages;
select a plurality of content objects associated with a first product tag based on the first data;
determine a placement score for each of the plurality of content objects;
select a first product web page of a plurality of product web pages to be populated with content associated with the first product tag;
prioritize the plurality of content objects based at least in part on a placement score of each of the plurality of content objects into a first order;
selectively assign a first subset of the plurality of content objects to the first product page in the first order;
dynamically update the graphical user interface to display the first subset of the plurality of content objects in the first order on the first product page;
receive, via the graphical user interface, click data;
generate, using the click data, a click-through-rate for each of the plurality of web pages having the first subset of the plurality of content objects over a predetermined period of time;
determine an improvement in a usage score of the first product page having the first subset of the plurality of content objects based on the click-through-rate;
automatically update the placement score of each of the first subset of the plurality of content objects based on the improvement;
select a second product web page of the plurality of product web pages to be populated with content associated with the first product tag;
prioritize the plurality of content objects into a second order based at least in part on the updated placement score of each of the first subset of the plurality of content objects;
selectively assign a second subset of the plurality of content objects to the second product web page in the second order; and
dynamically update the graphical user interface to display the second subset of the plurality of content objects in the second order on the second product web page.

12. The system of claim 11, wherein the instructions, when executed by the one or more processors, are configured to cause the system to:
determine a placement weight for each of the plurality of content objects, wherein each of the plurality of product web pages have a current page weight limit indicative of available space for content.

13. The system of claim 12, wherein selectively assigning a first subset of the plurality of content objects to the first product page in the first order is based at least in part on a comparison of a placement weight associated with each of the first subset of the plurality of content objects and the current page weight limit of the first product page.

14. The system of claim 12, wherein selectively assigning a second subset of the plurality of content objects to the second product page in the second order is based at least in part on a comparison of a placement weight associated with each of the second subset of the plurality of content objects and the current page weight limit of the second product web page.

15. The system of claim 11, wherein determining the placement score for each of the plurality of content objects further comprises:
scoring each content object of the plurality of content objects with a first score based on how recently each respective content object was generated;
scoring each content object of the plurality of content objects with a second score based a number of words contained within each respective content object; and
summing the first score and the second score for each content object of the plurality of content objects to determine the placement score.

16. The system of claim 11, wherein the usage score of the first product page is greater than the usage score of the second product page, and the first product page is populated with content objects before the second product page based on the usage score of the first product page being greater than the usage score of the second product page.

17. The system of claim 6, wherein the usage score is updated in real-time.

18. The system of claim 6, wherein the placement score of each of the first subset of the plurality of content objects is updated in real-time.

19. The system of claim 18, wherein the updated placement score is used to update a page-specific order of the first subset of the plurality of content objects on each of the plurality of product web pages in real-time.

20. The system of claim 6, further comprising:
generating, using the click data, a metric describing a number of sold products associated with a respective product page of the plurality of product pages having the first subset of the plurality of content objects over a predetermined period of time, and
wherein determining an improvement in a usage score of the first product page having the first subset of the plurality of content objects is further based on the metric.

* * * * *